United States Patent [19]

Goodlaxson

[11] 4,395,890
[45] Aug. 2, 1983

[54] DRIVE MECHANISM

[75] Inventor: John D. Goodlaxson, Colfax, Iowa

[73] Assignee: The Maytag Company, Newton, Iowa

[21] Appl. No.: 290,957

[22] Filed: Aug. 7, 1981

[51] Int. Cl.³ .......................................... D06F 37/40
[52] U.S. Cl. ...................................... 68/23.7; 68/133; 74/48
[58] Field of Search ....................... 68/23.6, 23.7, 133; 74/25, 40, 42, 47, 48, 70

[56] References Cited

U.S. PATENT DOCUMENTS

| | | | |
|---|---|---|---|
| 1,591,208 | 7/1926 | Boerngen | 74/70 |
| 2,830,457 | 4/1958 | Dyer et al. | 74/70 |
| 2,871,710 | 2/1959 | Sakagami | 74/70 |
| 2,912,869 | 11/1959 | Tweedy | 74/70 |
| 3,160,902 | 12/1964 | Aymar | 74/47 X |
| 3,400,595 | 9/1968 | Pfeiffer | 74/47 |
| 3,859,861 | 1/1975 | Buschi | 74/42 |
| 4,137,783 | 2/1979 | Oosterling et al. | 74/47 |

Primary Examiner—Philip R. Coe
Assistant Examiner—Thomas W. Epting
Attorney, Agent, or Firm—Richard L. Ward

[57] ABSTRACT

A drive mechanism is provided for converting a rotary input to an oscillatory output. The mechanism includes a housing having axially aligned first and second support members. Input and output shafts are journaled within the first and second support members and are substantially axially aligned one with the other. A drive pinion is mounted on the input shaft within the housing and is rotatable thereby. A bevel gear is mounted within the housing and in driving engagement with the pinion. A coupling is provided which has a first end in journaled association with the bevel gear in a position angularly displaced from the rotational axis thereof. The second end of the coupling is pivotally and drivingly connected to the output member at the intersection of the center lines of the bevel gear and the output member. The center line of the coupling defines a cone as the coupling is rotated with the bevel gear and the coupling is operable for oscillating the output member through an angle corresponding to the included angle of the cone.

17 Claims, 5 Drawing Figures

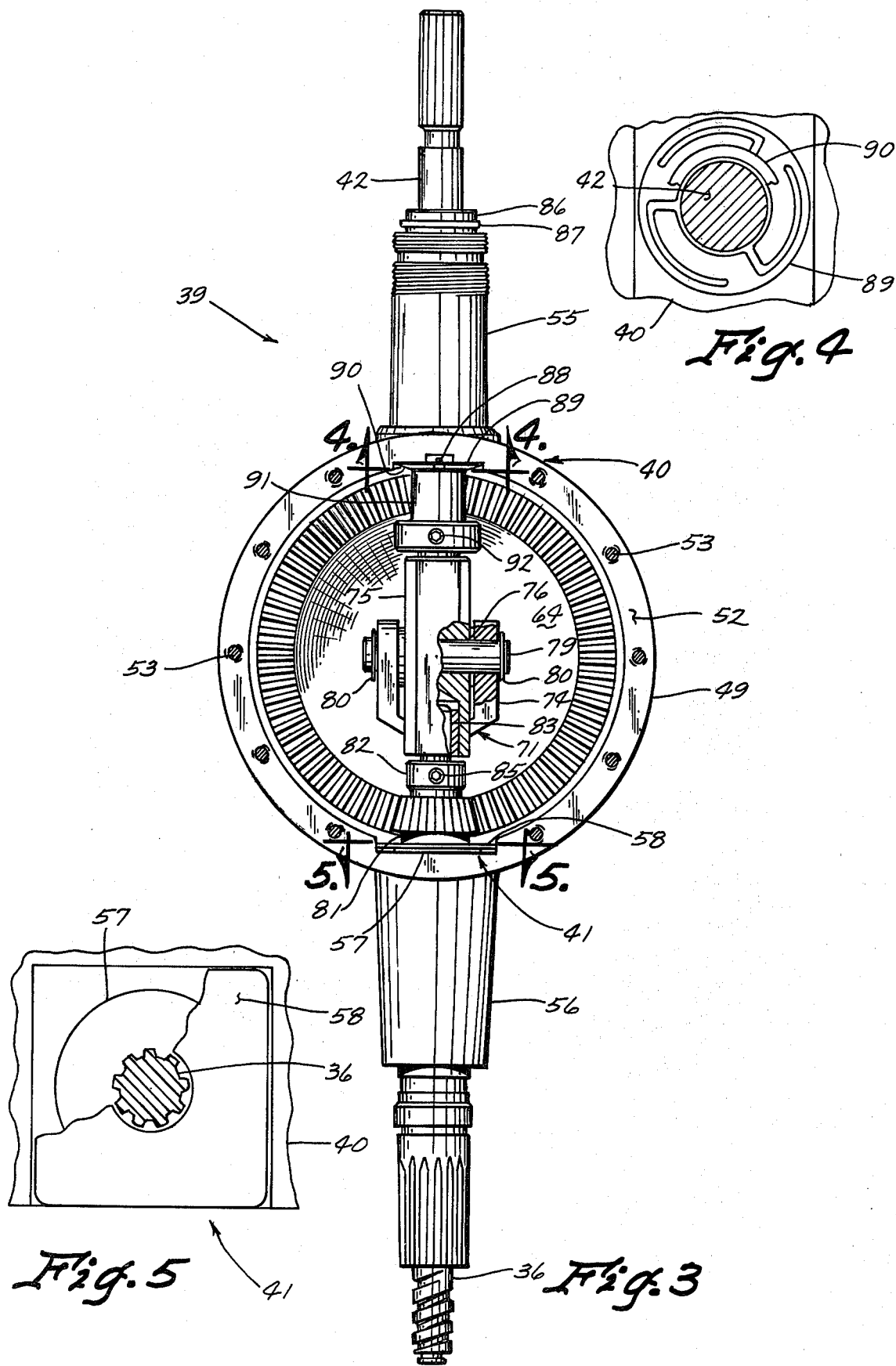

DRIVE MECHANISM

BACKGROUND OF THE INVENTION

This invention relates generally to the field of drive mechanisms and more particularly to a simplified drive operable for converting a rotary inut motion to an oscillatory output motion in a fabric washing machine where the input and output shafts of the drive mechanism are axially aligned.

Transmissions or drive mechanisms as used in automatic fabric washing machines have, generally speaking, utilized an oscillatory agitator stroke ranging from 170 degrees to 210 degrees with the oscillations per minute ranging from 63 to 100 or 42 to 60 depending upon the speed of the drive motor. It has been found to be advantageous in some situations to provide a drive mechanism which will oscillate the agitator at a generally higher rate of approximately 150 strokes per minute and through a substantially shortened stroke of approximately 90 degrees or less. A drive of this type, when combined with the proper agitator design, provides improved turnover of clothing and corresponding improved washability.

Mechanisms of the type which may be adapted to provide this motion have been used in principle in various drive mechanisms. For example, in U.S. Pat. No. 2,830,457, an automotive windshield wiper drive mechanism is shown in which rotation of a worm causes rotation of a worm gear which, in turn, will rotate an arm or connecting member connected to the worm gear at a point radially displaced from the rotative axis of the gear. As the bearing end of the connecting member rotates, the opposite end will impart an oscillatory movement to the output shaft. The output shaft will be oscillated through an arc of substantially 90 degrees in each revolution of the worm gear. Means are also provided for axially moving the worm gear to change the angle of the connecting arm relative to the worm gear for altering the amplitude of oscillation of the output shaft.

In U.S. Pat. No. 3,400,595 a mechanism is provided for converting rotary to oscillatory motion for use in a testing apparatus such as a viscurometer. A connecting rod between a U-shaped member and the drive member is selectively movable between a series of connecting points to provide for adjustment of the amplitude of oscillation of the output shaft.

In U.S. Pat. No. 4,137,783 a flywheel member is shown which has an eccentrically disposed supporting member. The supporting member mounts one end of a coupling member with the opposite end of the coupling member attached to a shaft perpendicular to the flywheel axis. The supporting member is adjustable within its flywheel mounting location to provide an adjustment for the amplitude of the oscillatory movement.

While numerous applications of mechanisms have been shown which offer conversion of rotary to oscillatory motion and which restrict the oscillatory stroke to generally 90 degrees, each of the disclosed mechanisms teach methods of varying the stroke or otherwise changing the output by moving the connecting member between the input and output shafts. None of these mechanisms teach the use of input and output shafts which are axially aligned for providing a compact drive mechanism which is easily balanced for spinning about a vertical center line.

SUMMARY OF THE INVENTION

It is therefore an object of the instant invention to provide an improved and simplified drive mechanism operable for converting a rotary input to an oscillatory output.

It is a further object of the instant invention to provide a drive mechanism for a fabric washing machine having a relatively short stroke and a relatively high rate of oscillation.

It is a still further object of the instant invention to provide a drive mechanism for a fabric washing machine having axially aligned input and output shafts.

Briefly, the instant invention achieves these objects in a drive mechanism for converting a rotary input to an oscillatory output. A housing is provided which includes first and second support members on a common axis. Input and output shafts are journaled within the first and second support members and are substantially aligned one with the other. Mechanism is provided for drivingly interconnecting the input member to the output member including an intermediate member having one end pivotally mounted on a pin extending transversely to and in driving connection to the output member. Apparatus driven by the input member is provided for driving the opposite end of the intermediate member in a generally circular pattern whereby the axis of the intermediate member defines a cone during movement thereof. The intermediate member is operable for pivoting on the pin responsive to displacement of the intermediate member along one axis of the circular pattern and operable for oscillating the output member responsive to displacement of the intermediate member along the other axis of the circular pattern.

Operation and construction of the drive mechanism as well as further objects and advantages thereof will become evident as the description proceeds and from an examination of the accompanying three pages of drawings.

BRIEF DESCRIPTION OF THE DRAWINGS

The drawings illustrate a preferred embodiment of the invention with similar numerals referring to similar parts throughout the several views, wherein:

FIG. 3 is a view of the drive mechanism taken generally along lines 3—3 of FIG. 2;

FIG. 4 is a fragmentary sectional view taken generally along lines 4—4 of FIG. 3; and FIG. 5 is a fragmentary sectional view taken generally along lines 5—5 of FIG. 3.

DESCRIPTION OF A PREFERRED EMBODIMENT

Figure 1:
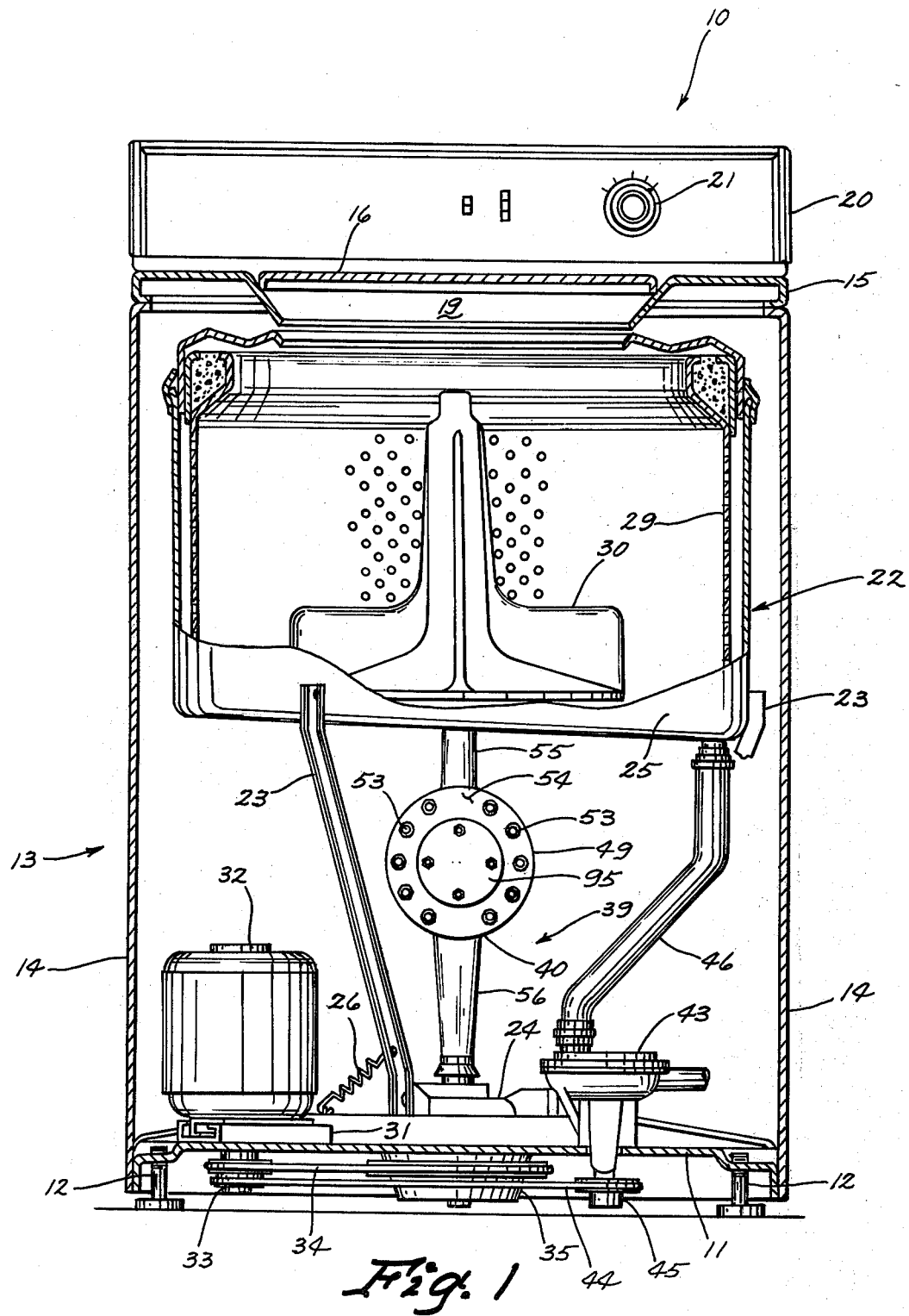
FIG. 1 is an overall view of an automatic fabric washing machine with various components broken away to show portions of the drive mechanism incorporating the instant invention.

Referring to FIG. 1 there is shown an automatic fabric washing machine 10 including a base frame 11 supported on a plurality of adjustable legs 12 and mounting a cabinet 13 comprising side walls 14 and a top cover 15. The top cover 14 includes a hinged panel comprising an access door or lid 16 normally covering a recessed loading opening 19 and movable to an open position to permit access to the opening 19. The top cover 15 further includes an upwardly extending housing 20 for accommodating various control members such as programming means actuatable by a dial 21.

Mounted within the cabinet 13 is a tub assembly 22 nutationally supported on the base frame 11 by an inverted tripod arrangement including tub braces 23 which are connected at the lower end to a support member 24 positioned on the base frame 11. The tub braces 23 are connected at their upper ends to a generally imperforate outer liquid container or tub 25. The tub braces 23 are also resiliently connected to the base frame 11 by means of centering springs 26 which resist rotation of the support member 24 relative to the base frame 11 but permit nutational movement relative to the base frame 11.

Revolvably mounted in the imperforate outer tub 25 is a perforate clothes basket or fabric container 29 in which is positioned an oscillatable agitator 30 for effecting movement of the fabrics and washing fluid within the tube assembly 22. The imperforate outer tub 25 and the perforate inner fabric container 29 are substantially aligned with the loading opening 19 in the top cover 15 for permitting the operator to place articles within the fabric container 29 and remove them upon completion of the cycle.

The base frame 11 also supports, through the motor mount 31, a reversible drive motor 32 operable in a bidirectional drive system for selectively effecting oscillation of the agitator 30 or centrifugal rotation of the inner fabric container 29. The drive system for effecting operation of the agitator and rotation of the fabric container 29 includes a double groove pulley 33 fixed to the shaft of the motor 32 and drivingly engaged with a main drive belt 34 which in turn is drivingly engaged with the main drive pulley 35. The main drive pulley 35 is drivingly connected to the agitator 30 through the drive shaft 36, shown in FIGS. 2 and 3, and the gearing of the drive mechanism or transmission 39 through the output shaft 42. The main drive pulley 35 is also drivingly connected to the fabric container 29 through the upper stem 55 of the transmission 39 and a clutch arrangement 41 located within the transmission 39. Operation of the motor 32 in a first direction effects rotation of the main drive pulley 35 for effecting oscillation of the agitator 30 through the drive shaft 36, transmission gearing and output shaft 42 attached to the agitator 30. Operation of the motor 32 in the opposite direction effects rotation of the main drive pulley 35, the transmission 39 and the fabric container 29 as a unit through the clutch arrangement 41 to effect centrifugal extraction of liquid from the fabric container 29.

The base frame 11 also supports a pump 43 driven by the bidirectional motor 32 through the motor mounted double groove pulley 33, the pump drive belt 44 and the pump mounted pulley 45. The pump 43 communicates with the outer tub 25 through the conduit 46 and is operable for pumping liquids from the outer tub 25 toward an external drain when the motor 32 is operated in the direction for effecting centrifugal rotation of the fabric container 29.

The fabric washing machine 10 is provided with controls for programming the fabric washing machine 10 through a sequence of operations including energization of the motor 32 for operation in a first direction to effect a washing and/or rinsing function followed by energization of the motor 32 in a second direction to effect a liquid extraction function.

The basic construction and mounting of the tube assembly 22, the operation of the inner tub or fabric container 29 and agitator 30 and operation of the clutch arrangement 41 are more clearly and specifically shown in the following patent, which is assigned to the assignee of the instant invention and which is incorporated herein by reference: Goodlaxson, U.S. Pat. No. 3,013,645.

Figure 2:
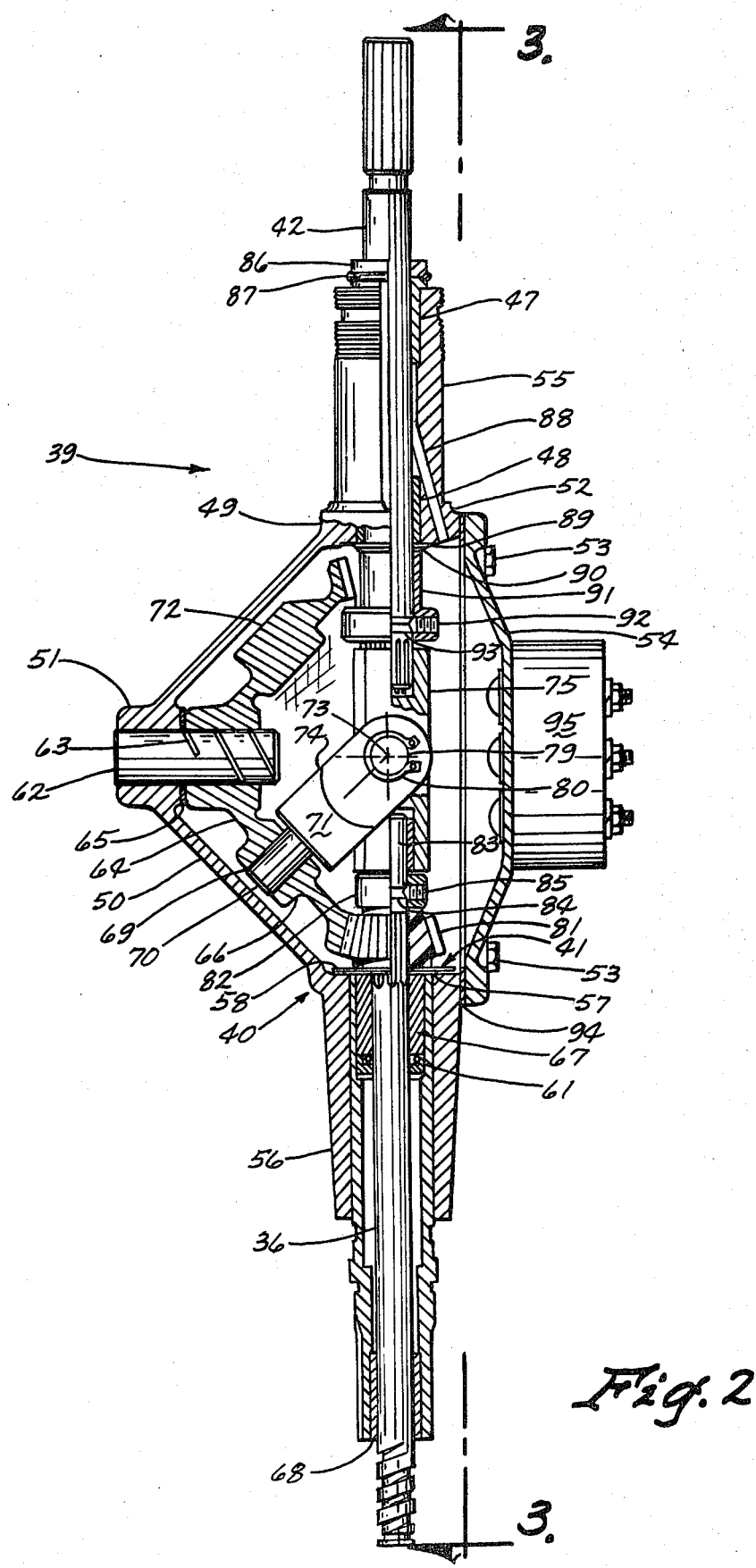
FIG. 2 is a cross sectional view of the drive mechanism removed from the fabric washing machine.

Turning now to FIGS. 2 and 3, there is shown the drive mechanism or transmission 39 operable for converting rotary input motion from the motor 32 to oscillatory output motion at the agitator 30 when the main drive pulley is rotated in a first direction and shown removed from the environment of the fabric washing machine 10.

The transmission 39 includes an elongated housing 40 having an enlarged generally circular central portion 49 as viewed in FIG. 3. As best shown in FIG. 2, one side wall 50 of the central portion 40 of the housing 40 is conically shaped and tapers inwardly along the horizontal center line of the housing 40 terminating in a circular boss 52 at the apex of the cone. The side 52 of the central portion 49 opposite the cone shaped side wall 50 is substantially open for providing access to the various components housed therein. This open side of the central portion 49 includes, as shown in FIG. 3, a substantially flat peripheral flange 52 which is drilled and tapped to receive a plurality of bolts 53 for securing a circular cover 54 to the open side of the housing 40.

The housing 40 further includes upper and lower stems or tubes 55 and 56 which are axially aligned one with the other and extend in opposite directions from the central portion 49 of the housing 40. The transmission 39 is effectively rotatably supported on the upper and lower stems 55 and 56 between the base frame 11 and the tube assembly 22 for unitary rotation with the fabric container 29 when the main drive pulley 35 is rotated in the opposite direction. The upper and lower stems 55 and 56 are counterbored at both ends to provide mounting receptacles for receiving journal bearings 47, 48, 67 and 68. The lower stem 56 also includes an oil seal 61 within the upper counterbore for preventing lubrication oil from escaping through the bearing 67 and out the bottom of the stem 56. Once the oil seal 61 and journal bearings 47, 48, 67 and 68 are pressed in place, assembly of the remaining transmission components can proceed.

The previously described boss 51 at the apex of the conically shaped side wall 50 of the housing central portion 49 is bored for receiving, in a press fit relationship, a gear mounting stud 62 as shown in FIG. 2. This gear mounting stud 62 includes an axial helical groove 63 for aiding in the lubrication of the bore of a bevel gear 64 which is mounted thereon.

The conically shaped bevel gear 64, which conforms generally to the conical contour of the side wall 50, is mounted on the gear mounting stud 62 by inserting the gear 64 through the open side of the central portion 49 and onto the gear mounting stud 62. A thrust washer 65 is located between the boss 51 and the base of the gear 64.

Located on the conical face of the bevel gear 64, and displaced at an acute angle with repsect to the rotation axis thereof, is a boss 66 with an aperture 69 bored on a center line which, in this embodiment, is angled 43 degrees from the rotational center line of the bevel gear 64 for receiving in journaled relationship the cylindrical first end portion 70 of a coupling 71. Located diametrically opposite the boss 66, the face of the gear 64 includes an enlarged section 72 for balancing the bevel gear 64 with respect to the boss 66.

In this embodiment of the invention, the coupling 71 extends from the boss 66 of the bevel gear 64 toward the center line of the axially aligned stems 55 and 56 at the 43 degree angle to the rotational axis of the bevel gear 64. The mounting stud 62 of the bevel gear 64 is at substantialy right angles to the axially aligned upper and lower stems 55 and 56.

As best shown in FIG. 3, the second end 74 of the coupling 71 is yoked or forked for mounting, in a straddling arrangement, to a connecting block 75. The connecting block 75 includes an aperture 76 at the connecting point 73 for transversely receiving shaft or pin 79 which passes through the forked second end 74 of the coupling 71 and through the aperture 76 for pivotally connecting the forked second end 74 of the coupling 71 thereto. The center lines of the coupling 71, the rotational axis of the bevel gear 64, the shaft or pin 79 and the axially aligned stems 55 and 56 intersect at a common connecting point 73. The shaft or pin 79 is retained in this posture by a pair of retaining rings 80.

The drive shaft or input shaft 36 has a helically formed lower end and a splined upper end. The drive shaft 36 is inserted into the lower stem 56 from the bottom and is journaled between the pair of bearings 67 and 68. As best shown in FIG. 5, a splined washer 57 and a clutch washer 58 form a clutch arrangement 41 the operation of which is shown generally in U.S. Pat. No. 3,013,645 incorporated herein by reference. The washers 57 and 58 are assembled over the splined end of the drive shaft 36 through the open side of the housing 40. A pinion gear 81 formed from a thermoplastic or other suitable material is placed over the splined end of the drive shaft 36 and into driving engagement with the teeth of the bevel gear 64.

A first locking collar 82 is placed over an extended cylindrical portion 83 of the splined end of the drive shaft 36. This extended cylindrical portion 83 includes a circumferential groove 84 for receiving the ends of a pair of setscrews 85 associated with the first locking collar 82 to lock the drive shaft 36 and its components in position within the lower stem 56. The extended cylindrical portion 83 of the drive shaft 36 is journaled into the end of the connecting block 75 as best shown in FIGS. 2 and 3 to provide a support for one end thereof.

The output or driven shaft 42 of the transmission 39 is splined at both ends with one end insertable into the upper stem 55 and journaled between the pair of bearings 47 and 48. Once inserted into the stem 55 the driven shaft 42 is prevented from further downward movement relative to the upper bearing 47 by means of a collar 86 pressed onto the driven shaft 42. An O-ring seal 87 encompasses the junction of the collar 86 and the upper bearing 47 to provide a proximity seal.

As best shown in FIG. 4, a spring washer 89 is assembled over the direction shaft 42 through the open side of the housing 40 and when the driven shaft 42 is in position, the spring washer 89 provides axial tension to maintain the collar 86 against the upper bearing 48. A washer 90 and a second locking collar 91 are also assembled onto the end of the driven shaft 42 as it is extended through the upper stem 55 with the washer 90 providing a flat running surface between the spring washer 89 and the second locking collar 91. The lower splined end of the driven shaft 42 is mated with the internally splined end of the connecting block 75 to provide a driving connection between the drive shaft 36, pinion 81, bevel gear 64, coupling 71, connecting block 75 and the driven shaft 42. The second locking collar 91 locks the driven shaft 42 in place by means of at least one setscrew 92 in contact with a circumferential groove 93 on the driven shaft 42.

After all components have been assembled within the housing 40 as described, approximately 24 ounces of a lubricating oil are added to the central portion 40 of the housing 40. As shown in FIG. 2, a passageway 88 is formed in the upper stem 55 to provide a path for lubricating oil to drain from between the bearings 47 and 48 into the central portion 49 of the transmission 39. To seal the housing 40 a gasket 94 and the housing cover 54 are bolted in place as best shown in FIG. 2. Secured to the housing cover 54 is a balance weight 95 which is designed to offset the weight of the bevel gear 64 and the conical side wall 50 of the housing 40 to maintain balance during spin operations.

In operation, the drive shaft 36 is rotated at approximately 600 revolutions per minute by the main drive pulley 35 which is drivingly connected to the drive motor 32 through the main drive belt 34. In this embodiment, the pinion 81 and mating bevel gear 64 are sized to provide a four to one reduction in rotational speed or 150 revolutions per minute at the bevel gear 64. As the bevel gear 64 is rotated, the cylindrical first end portion 70 of the coupling 71 rotates within the aperture 69 in the boss 66 of the bevel gear 64. The forked second end 74 of the coupling 71 pivots up and down while it oscillates back and forth at the common connecting point 73. More specifically, as the bevel gear 64 is rotated the center line of the coupling 71 defines a cone having an included angle of 86 degrees. The base of the cone is located on the circle described by the radius to the aperture 69 and its apex is located at the common connecting point 73. Upon rotation of the bevel gear 64 about its horizontal center line the included angle of the cone is effectively translated to pivotal movement of corresponding angular magnitude at the common connecting point 73. Thus, for each complete revolution of the bevel gear 64, the coupling 71 will drive the connecting block 75 through 86 degrees in one direction for the first 180 degrees of rotation and 86 degrees in the opposite direction for the second 180 degrees of rotation.

If the first end 70 of the coupling 71 were observed as it is rotated with the bevel gear 64, a circular pattern describing the base of the cone would be seen in a generally vertical plane. If the circular pattern is divided into the four quadrants of a circle by establishing a horizontal axis parallel to the axis of the shaft or pin 79 and a vertical axis parallel to the axis of the output shaft 42, a point representing the first end 70 of the coupling 71 can be followed around the circle. Rotation of this point will effect a constantly changing value of horizontal and vertical coordinates ranging from 0 up to a maximum represented by the point of attachment of the first end 70 of the coupling 71 on the bevel gear 64. As the point representing the first end 70 is rotated, the horizontal axis coordinate will be translated to driving or oscillatory motion of the output shaft 42. The corresponding vertical axis coordinate will at the same time be translated to pivotal movement of the forked second end 74 on the pin or shaft 79. The driving and pivoting movement at the forked second end 74 both occur at the same point in time and are constantly changing as the first end 70 is rotated by the bevel gear 64. Therefore, in a complete revolution of the bevel gear 64, the coupling 71 is both pivoted on and driving the pin or shaft 79 to effect the movement of the output shaft 42 thrugh an oscillatory stroke of 86 degrees.

While a stroke of 86 degrees and a rate of 150 oscillations per minute is disclosed herein, it can be readily seen that the amplitude of the stroke can be varied by changing the angular mounting point of the cylindrical first end 70 of the coupling 71 on the bevel gear 64. Experimentation has shown that by utilizing a special offset version of the coupling 71, a stroke of substantially 120 degrees can be attained. However, from a practical design standpoint, it has been determined that a stroke of substantially 100 degrees is a general physical limit for the mechanism. At 100 degrees the components can be designed for optimum strength and simplicity. An operational center line or axis of the coupling 71 effectively extends from the common connecting point 73 through the center of the aperture 69 regardless of whether the coupling 71 is formed as a symmetrical or offset member. Also, the oscillations per minute can be varied by altering the input rate or by changing the ratios of the bevel gear 64 and the pinion 81.

This particular drive mechanism when employed in the transmission 39 of an automatic fabric washing machine 10 lends itself to very simple teardown should repair be necessary. By laying the washing machine 10 on its back and removing a front panel (not shown), the transmission 39 is totally accessible. With the washing machine 10 in this position the transmission 39 can be maneuvered so that the housing cover 54 is facing up. By removing the bolts 53 the housing cover 54 can be removed to expose the interior of the central portion 40 of the housing 40. Loosening the setscrews 85 and 92 associated with the first and second locking collars 82 and 91 will allow both the drive shaft 36 and the driven shaft 42 to be retracted into its respective stem 56 or 55. The connecting block 75, the coupling 71, the bevel gear 64, the pinion 81 or any other component can now be removed from the central portion 49 of the housing 40 without further tearing down the washing machine 10.

It is thus seen that the drive mechanism or transmission 39 as disclosed herein provides a simple mechanism for providing an oscillatory output motion from a rotary input motion and with the center lines of the input and output shafts 36 and 42 being axially aligned. The transmission 39 also provides a system which is easily balanced about its rotational center line by attaching the proper weight 95 to the housing cover 54.

In the drawings and specification, there has been set forth a preferred embodiment of the invention and although specific terms are employed these are used in a generic and descriptive sense only and not for purposes of limitation. Changes in the form and the proportion of parts as well as the substitution of equivalents are contemplated as circumstances may suggest or render expedient without departing from the spirit or scope of the invention as further defined in the following claims.

I claim:

1. A drive mechanism for converting a rotary input to an oscillatory output, the combination comprising: a housing including first and second support means on a common axis; input means and output means journaled within said first and second support means and substantially aligned one with the other; and means drivingly interconnecting said input means to said output means including an intermediate member having one end pivotally mounted on a pivot member extending transversely to and in driving connection to said output means and further including means driven by said input means for driving the opposite end of said intermediate member in a generally circular pattern whereby the axis of said intermediate member defines a cone during movement thereof, said intermediate member being operable for pivoting on said pivot member responsive to displacement of the opposite end of said intermediate member along one axis of said circular pattern and operable for oscillating said output means responsive to displacement of the opposite end of said intermediate member along the other axis of said circular pattern.

2. A drive mechanism as defined in claim 1 wherein said means driven by said input means includes a bevel gear mounted within said housing on a rotational axis generally perpendicular to the substantially aligned input and output means.

3. A drive mechanism for converting a rotary input to an oscillatory output, the combination comprising: a housing having axially aligned first and second support means; input and output means journaled within said first and second support means and substantially axially aligned one with the other; a first drive member within said housing and rotatable by said input means; a second drive member mounted within said housing and in driving engagement with said first drive member; and coupling means having a first end in journaled association with said second drive member at a position angularly displaced from the rotational axis thereof and a second end pivotally and drivingly connected to said output means at the intersection of the center lines of said second drive member and said output means, said coupling means having a center line defining a cone as said coupling means is moved with said second drive member, said coupling means being operable for oscillating said output means through an angle corresponding to the included angle of said cone.

4. A drive mechanism as defined in claim 3 wherein said output means includes a transversely mounted pin for pivotally and drivingly connecting the second end of said coupling means thereto.

5. A drive mechanism as defined in claim 4 wherein the second end of said coupling means is forked for straddling said output means and connecting to said pin.

6. A drive mechanism as defined in claim 4 wherein said coupling means is pivoted on said pin along a center line normal to the center line of said output means and oscillates said pin on the center line of said output means as said coupling means is moved with said second drive member.

7. A drive mechanism as defined in claim 3 wherein said housing includes an enlarged central section and said axially aligned support means includes a pair of tubular support stems.

8. A drive mechanism for converting a rotary input to an oscillatory output, the combination comprising: a housing having a central section and axially aligned first and second support means on opposite sides of said central section; input and output means journaled within said first and second support means respectively and substantially axially aligned one with the other; a first drive member within said central section and rotatable by said input means; a second drive member mounted within said central section and in driving engagement with said first drive member; and means connecting said second drive member with said output means including coupling means having one end journaled to said second drive member on an axis angularly displaced from the rotational axis of said second drive member and pin means extending transversely to the axis of said output means for pivotally and drivingly connecting the other end of said coupling means to said output means, said coupling means being operable upon rotation of said second drive member for revolving movement of the axis thereof in a generally conical path about the axis of rotation of said second drive member while pivoting on and driving said pin means whereby said coupling means is operable for oscillating said output means through an angle corresponding to the included angle of said conical path responsive to rotation of said second drive member.

9. A drive mechanism as defined in claim 8 wherein said first and second drive members are pinion and bevel gears respectively.

10. A drive mechanism as defined in claim 8 and further including a connecting block drivingly connected to said output means and journaled to said input means, said connecting block forming an extension of said output means and providing a mount for said pin means.

11. A drive mechanism for converting a rotary input to an oscillatory output, the combination comprising: a housing having an enlarged central section and first and second support stems extending in axially aligned opposite directions from said central section; input and output means journaled within said first and second support stems and substantially axially aligned one with the other; a first drive member within said central section and rotatable by said input means; a second drive member mounted within said central section and in driving engagement with said first drive member; connecting means generally axially aligned with and supported between the ends of said input and output means within said central portion, said connecting means drivingly connected to said output means and journaled to said input means; and means for oscillating said output means responsive to rotation of said second drive member including a coupling having a first end in journaled association with said second drive member at a point angularly displaced from the rotational axis thereof and a pin extending transversely to the axis of said connecting means at a point defined by the intersection of the center lines of said second drive member and said connecting means, said coupling further including a second forked end pivotally and drivingly engaged with said connecting means through said pin, the center line of said coupling defining a cone as its first end is rotated by said second drive member whereby the angular displacement of said coupling on said second drive member is translated to oscillatory movement corresponding to the included angle of said cone at said output means.

12. A drive mechanism as defined in claim 11 wherein said first and second drive members are pinion and bevel gears respectively.

13. A drive mechanism as defined in claim 11 wherein the first end of said coupling is angularly displaced at an angle generally less than 50 degrees relative to the rotational axis of said second drive member to describe an oscillatory movement at said output means of generally less than 100 degrees.

14. A drive system for an automatic fabric washing machine having a stationary outer tub, an inner tub rotatably nested therein and a fabric agitator operable within the inner tub, the combination comprising: a drive motor for providing bidirectional rotary input to said drive system; and transmission means arranged between said drive motor and said inner tub and agitator and operable for converting a first direction rotary input to oscillatory movement of said agitator and for effecting unitary rotation of said inner tub and said transmission means responsive to the other direction of rotary input, said transmission means including a housing with first and second support means on a common axis, input and output means journaled within said first and second support means and substantially axially aligned one with the other, a first drive member within said housing and rotatable by said input means, a second drive member mounted within said housing and in driving engagement with said first drive member, said transmission means further including coupling means having a first end associated with said second drive member at a position angularly displaced from the rotational axis thereof and a second end pivotally and drivingly connected to said output means with the center line of said coupling means defining a cone as it is moved with said second drive member for oscillating said output means and said agitator, clutch means engageable during said other direction of rotary input for drivingly connecting said housing to said input shaft and effecting rotation of said transmission means and said rotatable inner tub about said common axis for centrifuging liquid from said fabrics.

15. A drive system as defined in claim 14 wherein said inner tub is drivingly connected to first support means of said transmission means for rotation therewith.

16. A drive system as defined in claim 14 wherein said clutch means is mounted within said housing and includes a first portion rotatable with said input means and a second stationary portion associated with said housing.

17. A drive system as defined in claim 14 wherein said transmission means is supported on said first and second support means for rotation of said transmission means about said common axis.

* * * * *

UNITED STATES PATENT AND TRADEMARK OFFICE
CERTIFICATE OF CORRECTION

PATENT NO. : 4,395,890
DATED      : August 2, 1983                              Page 1 of 2
INVENTOR(S) : John D. Goodlaxson It is certified that error appears in the above–identified patent and that said Letters Patent are hereby corrected as shown below:

| | |
|---|---|
| Col. 1, line 7   | "inut" should be -- input -- |
| Col. 2, line 66  | "14" should be -- 15 -- |
| Col. 3, line 21  | "tube" should be -- tub -- |
| Col. 4, line 1   | "tube" should be -- tub -- |
| Col. 4, line 19  | "40" (1st. occurr.) should be --49-- |
| Col. 4, line 22  | "52" (1st. occurr.) should be --51-- |
| Col. 4, line 36  | "tube" should be -- tub -- |
| Col. 4, line 63  | "repsect" should be -- respect -- |
| Col. 4, line 63  | "rotation" should be -- rotational -- |
| Col. 5, line 58  | "direction" should be -- driven -- |

UNITED STATES PATENT AND TRADEMARK OFFICE
CERTIFICATE OF CORRECTION

PATENT NO. : 4,395,890  Page 2 of 2

DATED : August 2, 1983

INVENTOR(S) : John D. Goodlaxson

It is certified that error appears in the above-identified patent and that said Letters Patent are hereby corrected as shown below:

Col. 6, line 9         "40" should be -- 49 --

Col. 7, line 3         "thrugh" should be -- through --

Col. 7, line 23        after "pinion" insert -- gear --

Col. 7, line 34        "40" should be -- 49 --

Signed and Sealed this

Fourth Day of October 1983

[SEAL]

Attest:

GERALD J. MOSSINGHOFF

Attesting Officer      Commissioner of Patents and Trademarks